United States Patent [19]

Cummings

[11] 3,863,940

[45] Feb. 4, 1975

[54] WIDE OPENING COLLET

[76] Inventor: Philip T. Cummings, 8924 Lindblade, Culver City, Calif.

[22] Filed: Apr. 4, 1973

[21] Appl. No.: 347,782

[52] U.S. Cl. ................................ 279/50, 279/43
[51] Int. Cl. ............................................ B23b 31/20
[58] Field of Search ......... 279/50, 43, 37, 57, 41 R, 279/41 A, 74

[56] References Cited
UNITED STATES PATENTS

| | | | |
|---|---|---|---|
| 2,545,610 | 3/1951 | Evans | 279/50 |
| 2,788,980 | 4/1957 | Black | 279/50 X |
| 2,856,192 | 10/1958 | Schuster et al. | 279/43 X |

*Primary Examiner*—Gil Weidenfeld
*Attorney, Agent, or Firm*—Jack D. Puffer

[57] ABSTRACT

A wide opening collet for use in machine tools which provides a wide work-piece receiving opening with a minimum axial motion, the opening action being accomplished quickly for use in automatic machining operations.

8 Claims, 3 Drawing Figures

WIDE OPENING COLLET

BACKGROUND OF THE INVENTION

This invention relates to machine tool collets and in particular to spring leaf collets having multiple leaves which provide a wide opening for the easy insertion of headed work pieces. In particular, the device of this invention provides such a wide opening device usable in existing automatic machine tools by providing an increased open diameter with minimum axial collet sleeve movement.

In the prior art devices for holding large diameter work pieces or pieces having a relatively large head portion, it was necessary to provide the machine with a chuck mechanism having sliding jaws. Alternatively, if a spring leaf collet was to be used, it was necessary to provide the collet closing sleeve with the ability to move axially a larger amount than usually available in standard machines in order to provide the wide opening and to insure that the collet was finally precisely closed and thus firmly holding the piece to be worked.

The use of either of the devices described above has the disadvantages of slowing the machine operation. In the case of automatic machine tools such as automatic screw machines, the loading and unloading speed of operation can make the difference between a profitable or unprofitable machining operation.

The present invention overcomes these disadvantages by providing a one piece, multi-leaved collet which can provide an open diameter on the order of twice the closed diameter. This advantage is provided using on the same order of axial motion of the collet sleeve as that required for standard collets which provide only a small fraction of this opening ratio. This device is adaptable to standard machine tools with minimum machine modification.

SUMMARY OF THE INVENTION

The present invention provides a spring leaf collet having an open diameter for receiving a work piece that is from 1.5 to two times the closed diameter of the collet. The axial collet sleeve motion required to close the collet from the fully open state is substantially the same as that required to close a standard prior art device having a substantially smaller ratio of open to closed diameters. These features are provided by making a collet of slightly greater length than usual such that the spring leaves when in their unconstrained condition provide a wide opening for receiving the work piece and, in addition, there is provided a two step closing cam surface. As the collet sleeve is moved in relation to the collet, it first encounters a high angle camming surface having a cam angle in relation to the rotational axis of the collet on the order of 45°. Thus when this surface is in contact with the moving collet sleeve the opening of the collet closes one unit for each unit of relative axial movement of the sleeve. Adjacent this high angle cam is a second surface nearer the work receiving end of the collet. This surface is set at a much smaller angle with respect to the axis of the collet. This surface at the standard collet closing angle of 15°, provides the precise closing motion required to firmly grip the work piece before it is worked upon.

The opening sequence of the collet of the invention occurs in the reverse order. Thus, the first movement of the sleeve, the collet opens a relatively small amount to slightly loosen the grip on the piece. Then, as the second surface is encountered the collet opens to its full diameter in a small amount of sleeve movement to quickly release the part for ejection and prepare the machine for acceptance of the next piece. This rapid release of the part provides not only the high rate of machine operation which is desirable for efficient machine utilization but also prevents faulty ejection of the pieces which can also degrade machine productivity. In the case of headed parts, when the collet is opened in the standard manner the long axial stroke requires substantially longer time for the part to be released. Thus, the collet releases the smaller body portion of the piece while still loosely holding the head portion. Frequently, in this case the piece is free to rotate in a plane transverse to the turning axis of the machine and when the head of the part is finally released, the part is ejected down toward the ways of the machine and frequently becomes caught there necessitating a shut down to clear the machine.

It is therefore an object of this invention to provide a machine tool collet having a wide opening in relation to its closed diameter.

It is another object of this invention to provide a work piece holding device which quickly grasps and releases the piece.

It is yet another object of this invention to provide a work piece holding device which will quickly grasp and release the piece with minimum axial motion of cooperating parts.

DESCRIPTION OF THE PREFERRED EMBODIMENT

Figure 1:
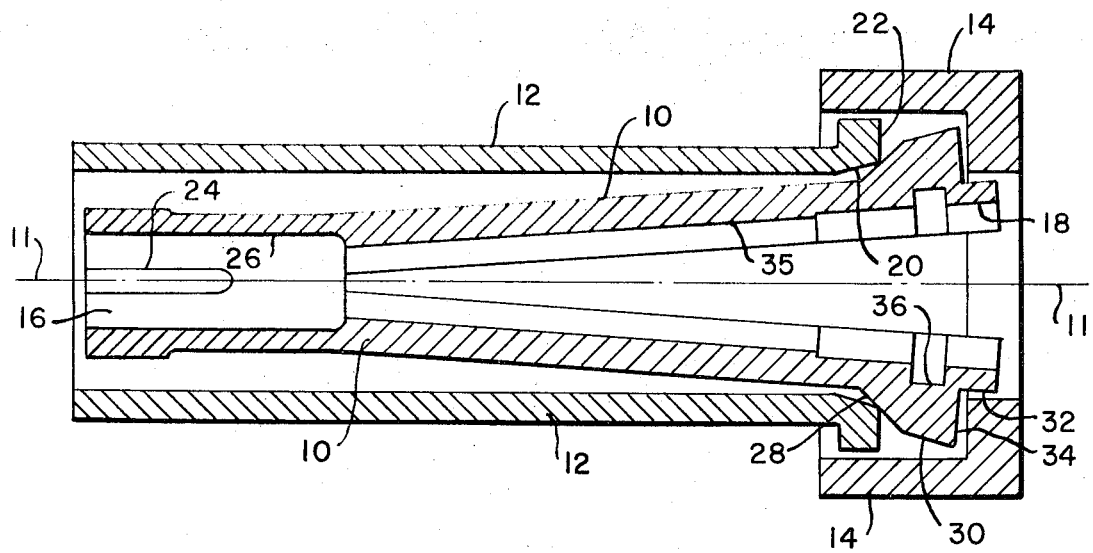
FIG. 1 is a sectional view of one embodiment of the device in the open position.
Figure 2:
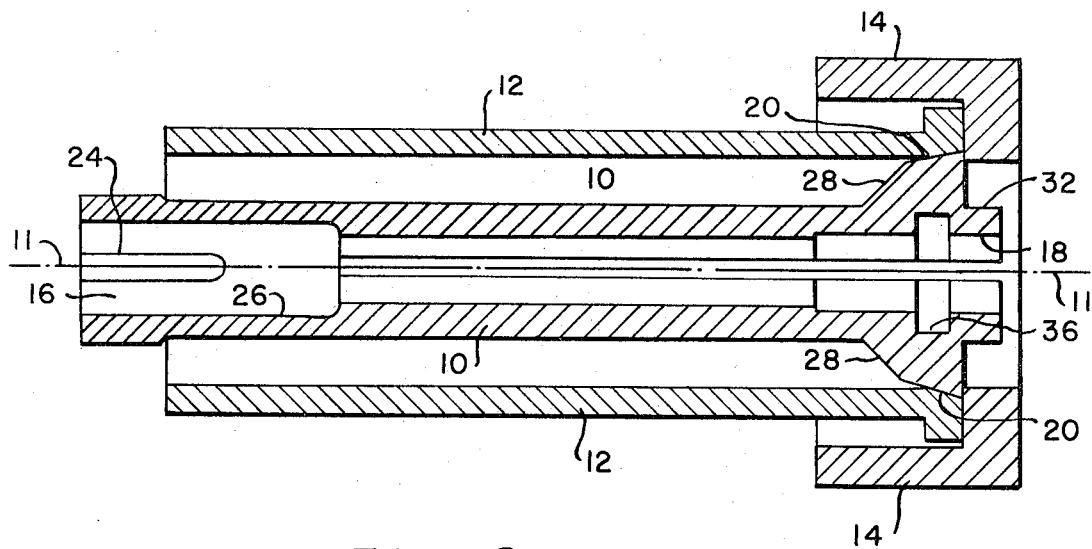
FIG. 2 is a sectional view of the device of FIG. 1 in the closed position.

Referring now to FIGS. 1 and 2 there is shown the collet of the invention in the open (FIG. 1) and closed (FIG. 2) positions. The collet is shown generally at 10 in both figures. The collet is characterized by having a central axis of rotation 11. In operation, the work piece being held by the collet is rotated about this longitudinal axis when being worked upon by the cutting members of the machine. The collet 10 is retained within a collet sleeve 12 generally concentric with the collet about the rotational axis 11. The collet is restrained in axial motion by the collar member 14.

The collet is provided with an attachment end 16 for attachment to the machine by any well known means for rotation about axis 11. The open or work piece receiving end of the collet is shown at 18. The sleeve member is generally a cylindrical member surrounding the collet member and has a collet closing surface 20 which is an annular surface set at a low angle with respect to the rotational axis of the collet. Typically, this angle is about 15 degrees inclined to the longitudinal axis of the collet.

The collet member 10 is provided with means for attachment to a rotating shaft of the machine in which it is to be used at the attachment end 16. This attachment may be by means of a slotted portion as shown at 24 or by any other well known attachment means. Each of the leaves of the collet is provided with a relieved portion as shown at 26 for controlling the spring rate of the collet leaves.

At the work piece receiving end of the collet there are provided at the outer radial surface thereof a series of camming surfaces for effecting the opening and closing of the collet. The first in this series of surfaces is the high angle surface shown at 28. This surface is nearest the attachment end of the collet and is set at a relatively high angle with respect to the rotational axis of the collet. In this embodiment this angle is about 45 degrees to the axis. Toward the work piece receiving end of the collet a second surface 30 is provided. This surface is set at a substantially smaller angle with respect to the rotational axis of the collet than the first surface. This surface is typically set at 15 degrees which is the standard collet closing angle generally used. This smaller angle insures precise closure to the predetermined diameter for properly holding the work piece. There is provided at 34 a collet stop surface to limit travel of the collet with respect to the sleeve.

In the internal diameter of the collet at the work piece receiving end there is provided a relieved portion shown at 36. This groove may be utilized to receive various adapter pads having a shape conforming to the piece to be machined. In the embodiment described above, it is possible to provide a diametral increase in the collet opening of about 0.455 inches with an axial stroke of only 0.330 inches. By comparison a typical collet of the prior art would provide only about 0.016 inches of diameter change for the same length of axial stroke.

Figure 3:
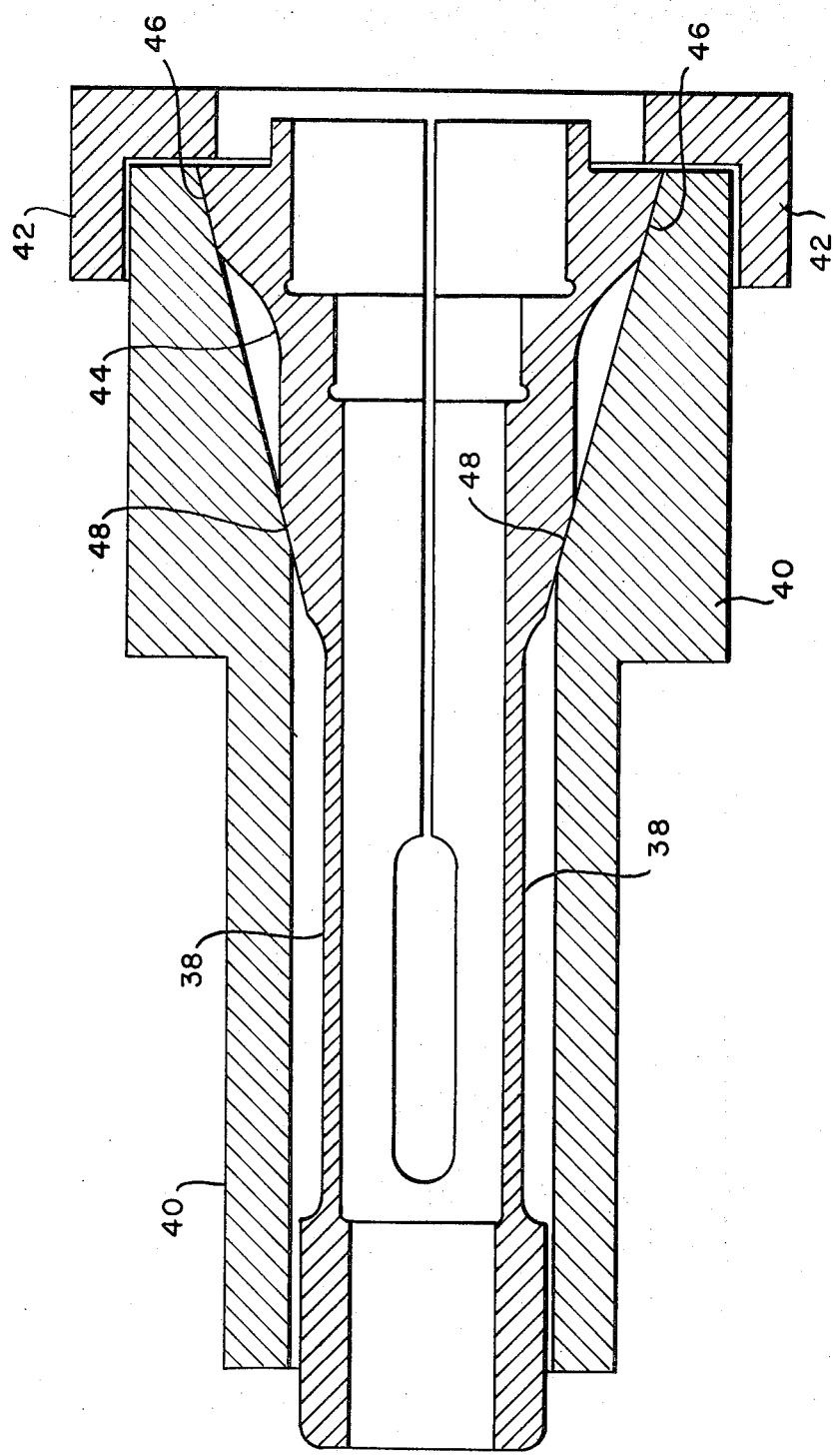
FIG. 3 is a sectional view of another embodiment of the invention.

Referring now to FIG. 3, there is shown another embodiment of the invention. The collet is generally shown at 38 and the sleeve 40 and collar 42 are arranged in generally the same manner as described above in connection with the embodiment of FIGS. 1 and 2 above. In the collet of this embodiment however, the high angle camming surface 44 for providing the quick opening action is formed in an arcuate shape starting tangent to the outside diameter of the collet and ending generally tangent to a 45° line with respect to the longitudinal axis of the collet. As in the previous embodiment, there is provided a low angle surface shown at 46 for the final closing action. In addition to this surface 46 there is provided a second low angle surface at 48. This second surface is provided in order to allow a longer gripping area for holding a part having a large overhang. By having the high angle cam located between the two low angle surfaces the quick opening feature can be maintained without increasing the axial stroke.

Thus it can be seen that there is provided by this invention a machine tool collet of the spring leaf type which provides a wide opening for headed or similar shaped work pieces and accomplishes this wide opening with little more axial stroke than that required for standard small opening collets. Additionally, there is provided a means for gripping pieces having large overhangs with respect to the collet opening and yet still having the wide, quick opening features described above.

While specific embodiments of the invention have been described and illustrated, it is to be understood that these embodiments are provided by way of example only and that the invention is not to be construed as being limited thereto, but only by the proper scope of the following claims.

I claim:

1. A spring leaf collet having a longitudinal axis comprising:

a plurality of resilient leaves mutually attached at one end of said collet and separated at the other end;

a first annular cam surface on each of said leaves adjacent the other end of said collet, said surface being formed at a predetermined angle with respect to the longitudinal axis of the collet;

a second annular cam surface adjacent said first cam surface and at a substantially larger angle than said first surface with respect to said longitudinal axis;

a third cam surface adjacent said second cam surface, said third surface being formed at a lower angle than said second surface with respect to the longitudinal axis and forming an annular conical surface of smaller diameter than the surface formed by said second surface; and said third surface being formed at generally the same angle as said first surface.

2. A spring leaf collet according to claim 1 wherein said second camming surface is an arcuate surface.

3. A spring leaf collet according to claim 2 wherein said arcuate surface is an annular arcuate surface the arc of said surface being tangent to the outside diameter surface of said collet at one end and at the other end adjacent the first cam surface tangent to a line at an angle substantially larger with respect to the longitudinal axis than the first camming surface.

4. A spring leaf collet according to claim 3 wherein the tangent angle of said arcuate surface adjacent said first cam surface is approximately 45°.

5. A spring leaf collet according to claim 4 wherein the angle of said first cam surface with respect to the longitudinal axis is approximately 15°.

6. A spring leaf collet according to claim 1 wherein said first and third cam surfaces are at an angle one-third of the second angle with respect to the longitudinal axis.

7. A spring leaf collet according to claim 6 wherein said first and third angles are approximately 15° and said first angle is approximately 45° with respect to said longitudinal axis.

8. A spring leaf collet according to claim 1 wherein said second surface is an arcuate surface connecting said first and third surfaces.

* * * * *